United States Patent [19]
Hayakawa

[11] Patent Number: 5,132,509
[45] Date of Patent: Jul. 21, 1992

[54] LASER BEAM CUTTING MACHINE AND LASER BEAM REFLECTOR THEREFOR

[75] Inventor: Yoshitaka Hayakawa, Aichi, Japan

[73] Assignee: Mitsubishi Denki K.K., Tokyo, Japan

[21] Appl. No.: 658,718

[22] Filed: Feb. 21, 1991

[30] Foreign Application Priority Data

Sep. 28, 1990 [JP] Japan ................... 2-60008

[51] Int. Cl.⁵ .............................................. B23K 26/00
[52] U.S. Cl. ............................ 219/121.67; 219/121.74
[58] Field of Search .................. 219/121.74, 121.84, 219/121.83, 121.62; 372/107; 350/632

[56] References Cited

U.S. PATENT DOCUMENTS

| | | | |
|---|---|---|---|
| 4,175,832 | 11/1979 | Umeki et al. | 350/486 |
| 4,544,241 | 10/1985 | LaBudde et al. | 350/486 |
| 4,778,233 | 10/1988 | Christenson et al. | 350/486 X |
| 4,915,492 | 4/1990 | Toth | 350/632 |

FOREIGN PATENT DOCUMENTS 59-109023 6/1984 Japan.

Primary Examiner—C. L. Albritton
Attorney, Agent, or Firm—Sughrue, Mion, Zinn Macpeak & Seas

[57] ABSTRACT

A laser beam reflector for reflecting a laser beam from a laser oscillator in a direction away from said laser oscillator includes a mirror holder, a mirror retainer removably coupled to the mirror holder, a bend mirror coupled to the mirror retainer for reflecting the laser beam, and a detecting device for detecting a positional relationship between the mirror holder and the mirror retainer. A laser beam cutting machine utilizes the laser beam reflector. When the mirror holder and mirror retainer are coupled properly, laser oscillation is performed. When the mirror retainer and holder are coupled improperly, laser oscillation is terminated immediately by a control device of the laser beam cutting machine.

17 Claims, 4 Drawing Sheets

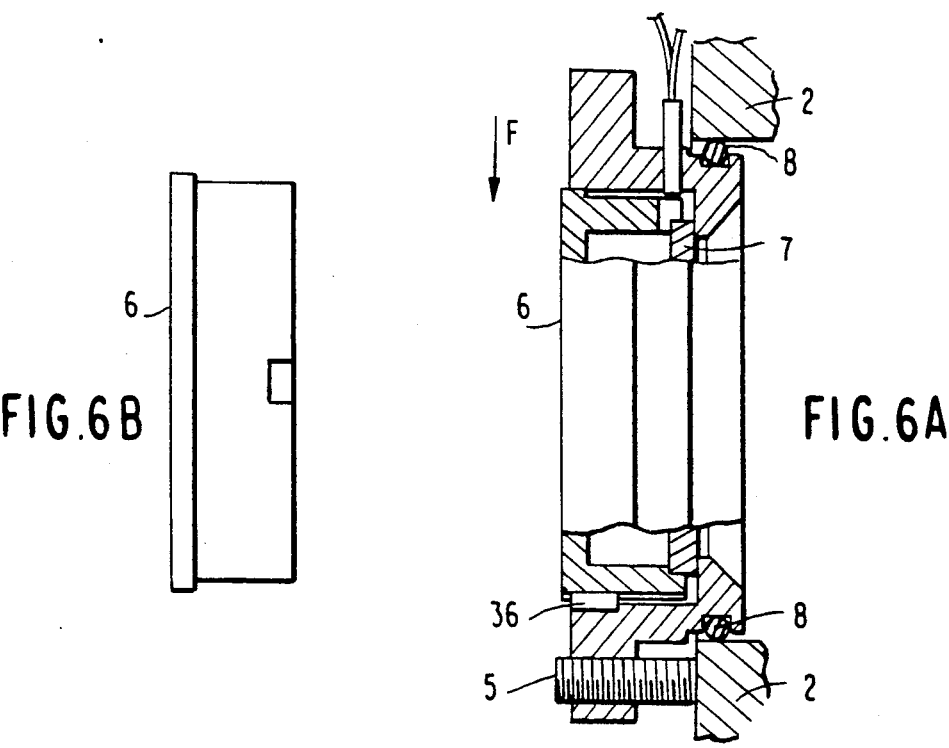
FIG. 6B
FIG. 6A
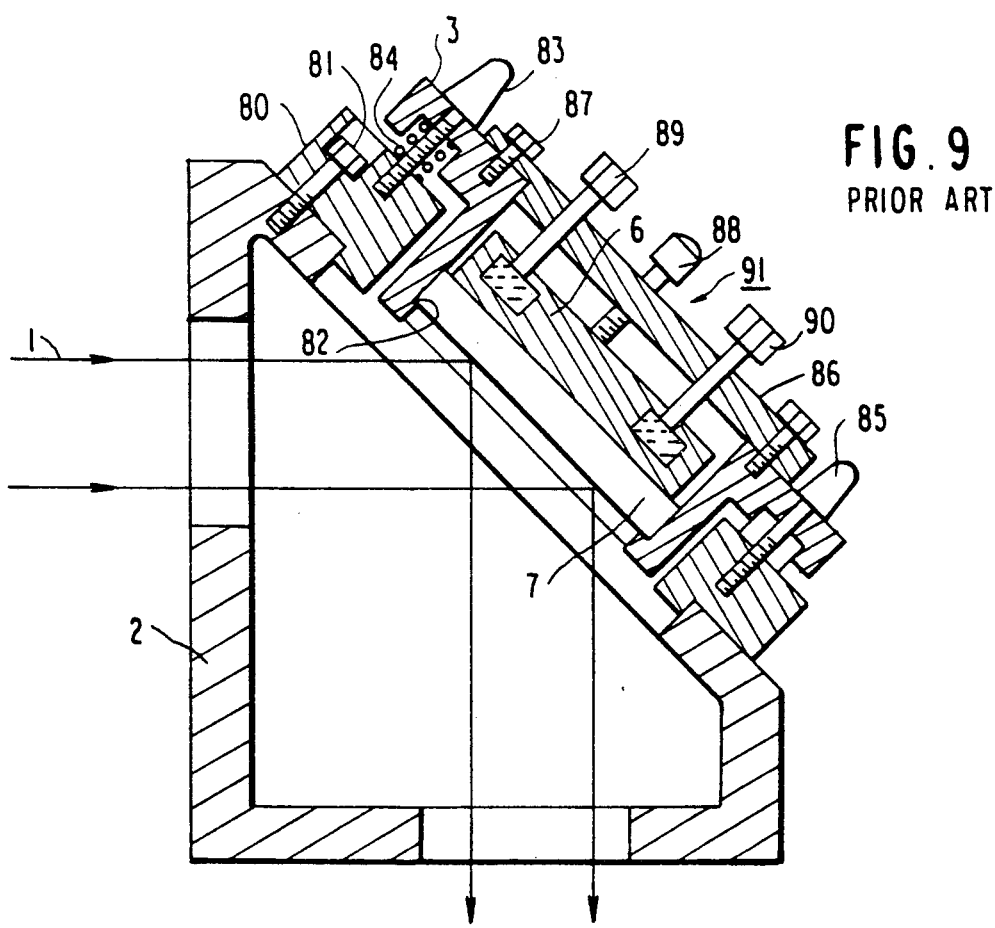
FIG. 9
PRIOR ART

LASER BEAM CUTTING MACHINE AND LASER BEAM REFLECTOR THEREFOR

The present invention relates to a laser beam reflector for reflecting a laser beam generated by a laser oscillator in a direction away from the laser oscillator, and also relates to a laser-beam cutting machine equipped with the laser beam reflector.

BACKGROUND OF THE INVENTION

Recently, laser-beam cutting has been increasingly employed for machining metals, plastics, wood, etc. Generally, laser-beam cutting machines used for this purpose include a laser beam reflector, such as a bend mirror, to control the direction of a laser beam used as the actual cutting tool.

FIG. 7 illustrates the configuration of a known laser beam reflector disclosed in Japanese Patent Publication No. 109023/1984, wherein a mirror retaining surface 60 of a mirror holder 6 is provided with a laser detecting element 61, formed of a thermistor or the like, having a light absorber applied to one surface thereof. The output end of the laser detecting element 61 is connected to an amplifier 63 via a lead wire 62, and the amplifier 63 is connected to a laser drive source 64 including a high-voltage power supply, etc.

Accordingly, a laser beam 1 generated by a laser oscillator is directed properly if a bend mirror 7 is in a normal state, and is irradiated to the laser detecting element 61 if the bend mirror 7 is damaged or disconnected from the holder 6 (i.e., oriented improperly). As a result, a detection signal is output from the laser detecting element 61, and then is amplified by the amplifier 63, and is input. to the laser drive source 64 to stop the oscillation of the laser.

FIGS. 8(a) and 8(b) show another embodiment disclosed in Japanese Patent Disclosure Publication No. 109023/1984, wherein FIG. 8(a) shows a normal status of a laser beam reflector, and FIG. 8(b) shows an abnormal status of the laser beam reflector. The reflecting surface of a reflecting member 65 made of a laser reflecting material, e.g. aluminum, is formed on the mirror retaining surface 60 of the mirror holder 6 at an angle of reflection different from that of the bend mirror 7. If the bend mirror 7 is in a normal state, the laser beam 1 from the laser oscillator is directed properly, as shown in FIG. 8(a). If the bend mirror 7 is disconnected from the mirror holder 6, the laser beam 1 is reflected by the reflecting member 65 and enters the laser detecting element 61, as shown in FIG. 8(b). An operation similar to that of the embodiment shown in FIG. 7 then is performed to stop the oscillation of the laser.

FIG. 9 is a sectional view illustrating the structure of yet another known laser beam reflector, disclosed in Japanese Patent Publication No. 28094/1987, wherein a bend block 2 reflects and introduces a laser beam 1 to a machining head. A housing 80 is secured to the bend block 2 by a screw 81. A cylindrical mirror holder 3 has a step 82 having a front end inside wall abutting the mirror surface side of a bend mirror 7, and an outward flange formed in the outer periphery of the side opposite to the step 82 (e.g., on the rear end side). The mirror holder 3 is positioned in a predetermined location against the housing 80 by a plurality of screws 83, springs 84, and a screw 85 loaded in the flange. A cover 86 is fixed to the rear end of the mirror holder 3 by screws 87. A screw 88 is engaged with and inserted into the cover 86 for pressing a mirror retainer 6 and for securing the bend mirror 7 to the mirror holder 3. An inlet 89 allows coolant to be circulated into the mirror retainer 6, and an outlet 90 allows the coolant to be discharged from the retainer 6. The mirror retainer 6, cover 86, and screw 88 constitute a pressing mechanism 91.

The operation of the above-described laser beam reflector will be described hereinafter. The bend mirror 7 employed must ordinarily be cleaned or replaced when it becomes dirty or chipped. For example, when the bend mirror 7 is to be removed for replacement, cleaning, etc. because its reflectance capability has been reduced due to dirt, etc., the cover 86 is designed to be freed by first extracting the screws 87 from the mirror holder 3, then removing the cover 86 and mirror retainer 6, and finally removing the bend mirror 7 from the rear end aperture of the mirror holder 3. Meanwhile, the cleaned bend mirror 7 or a new bend mirror 7 is reinstalled by bringing the bend mirror 7 into contact with the step 82 in a reverse procedure of the above-described steps and then securing the bend mirror 7 pressed against the mirror holder 3 via the mirror retainer 6 by the screw 88.

The above-described known laser beam reflector is designed to stop the oscillation of the laser if the bend mirror is disconnected from the mirror holder or if the bend mirror is damaged.

However, when the mirror holder retaining the bend mirror is lifted or disconnected from the fixed side of the laser-beam cutting machine, or when the bend mirror is removed from the laser-beam cutting machine together with the mirror holder for the cleaning or changing of the bend mirror, the laser oscillation cannot be stopped if the laser oscillator is oscillating, i.e. if the laser beam is being irradiated into the bend mirror. To prevent an output reduction of the laser-beam cutting machine, the bend mirror is cleaned or replaced often. However, as a result, the known cutting machine may irradiate the operator, equipment, the building, etc., thus potentially creating a safety problem.

Accordingly, an object of the present invention is to overcome the disadvantages of the conventional systems by providing a laser beam reflector achieving a higher level of safety than that provided by the conventional systems, and by providing a laser-beam cutting machine which employs the laser beam reflector.

SUMMARY OF THE INVENTION

To achieve the above-described and other objects, features, and advantages, the laser beam reflector of the present invention comprises a mirror holder, a mirror retainer removably coupled to the mirror holder, a bend mirror coupled to the mirror retainer for reflecting the laser beam, and detecting means for outputting a detection signal corresponding to a positional relationship between the mirror holder and the mirror retainer.

Additionally, a laser beam cutting machine according to the present invention includes: a laser oscillator for generating a laser beam; a laser beam reflector comprising a mirror holder, a mirror retainer removably coupled to the mirror holder, and a bend mirror coupled to the mirror retainer; and a controller for controlling the laser oscillator according to a detection signal representing the positional relationship between the mirror holder and the mirror retainer.

The above-described laser beam reflector generates the detection signal when the coupling and installation of the mirror retainer to the mirror holder is complete, and switches off the detection signal when the coupling of the mirror retainer to the mirror holder is incomplete or improper.

The above-described laser beam cutting machine performs laser oscillation when the mirror retainer is coupled properly to the mirror holder.

BRIEF DESCRIPTION OF THE DRAWINGS

The above-mentioned and other objects of the present invention as well as the novel features thereof will be apparent from the description herein when taken in conjunction with the drawings attached hereto in which:

FIGS. 6A and 6B are an illustration of an exemplary embodiment of a detection means used in the laser beam reflector according to the embodiment of the present invention;

FIGS. 7, 8(a) and 8(b) and 9 illustrate different conventional laser beam reflector systems.

DESCRIPTION OF THE PREFERRED EMBODIMENT

Figure 1:
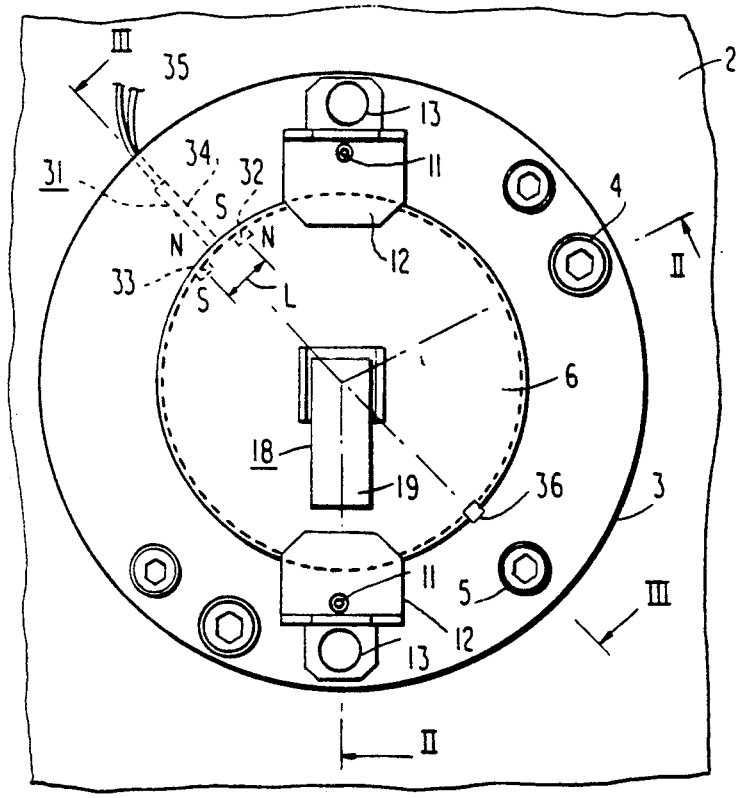
FIG. 1 is a top view of a laser beam reflector illustrating an embodiment of the present invention.
Figure 2:
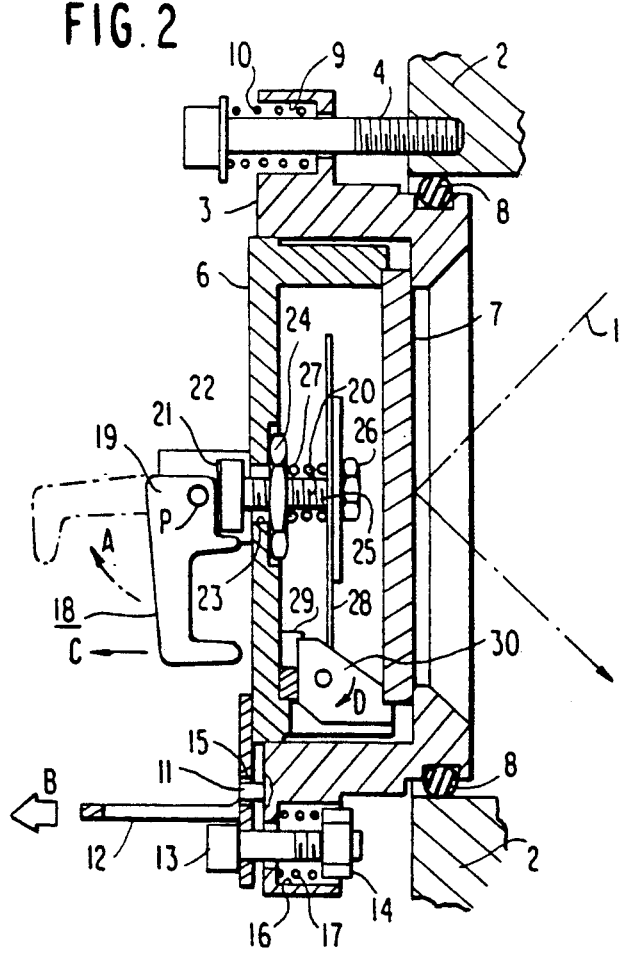
FIG. 2 is a sectional view taken along the plane II—II of FIG. 1.
Figure 3:
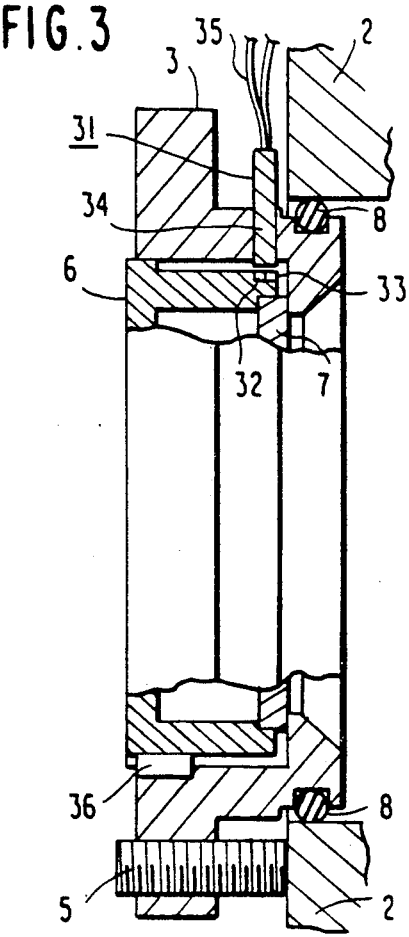
FIG. 3 is a section view taken along the plane III—III of FIG. 1.

An embodiment of the present invention will now be described with reference to the drawings. Referring to FIGS. 1-3, a bend block 2 directs a laser beam 1 to a cutting head. A mirror holder 3 is positioned and fixed to a predetermined location of the bend block 2 by screws 4 and 5. The tip of the screw 4 is threaded into the bend block 2, and the tip of the screw 5 (as shown in FIG. 3) abuts the surface of the bend block 2.

A mirror retainer 6 is removably coupled to the mirror holder 3 by a mechanism mentioned hereinbelow, and a bend mirror 7 is coupled to the mirror retainer 6 for reflecting the laser beam 1. The mechanism for coupling the bend mirror 7 to the mirror holder 3 will be described hereinbelow.

An O-ring 8 shields a gap between the inner periphery of the bend block 2 and the outer periphery of the mirror holder 3. A first recess 9 is provided in the outer periphery of the mirror holder 3, and a spring 10, contained in the first recess 9, generates pressure between the head of the screw 4 and the bottom of the first recess 9 so as to press the mirror holder 3 against the bend block 2. A projection 11 is provided on a predetermined area of the mirror holder 3. A pressing member 12 is made by bending a plate member in an approximately T-shape. One end of the pressing member 12 abuts the mirror retainer 6, and another end of the pressing member 12 is held to the mirror holder 3 by a bolt 13 and a nut 14.

A hole 15 is formed in the pressing member 12 for accepting projection 11 so as to restrict the position of pressing member 12, thus preventing member 12 from moving due to vibration, external shock, etc. applied thereto.

A second recess 16, formed in the mirror holder 3 in a location different from that of the first recess 9, has an aperture in a direction opposite to the first recess 9. A spring 17 is positioned between the bottom of the second recess 16 and the nut 14 to bring the mirror retainer 6 into close contact with the mirror holder 3 via pressing member 12.

A releasing mechanism 18 couples or removes the mirror retainer 6 to or from the mirror holder 3, and fixes or releases the bend mirror 7 to or from the mirror retainer 6. The releasing mechanism 18 includes a handle 19 pivoting in the direction of arrow A (as shown in FIG. 2) on a supporting pivot point P, a shaft 20 having a pressed area 21 which is pressed by a predetermined portion of the handle 19 as the handle 19 pivots, and a guide 22 of the shaft 20 which is designed to move through a hole 23 formed in the center of the mirror retainer 6 in its axial direction. A first nut 24, fitted to threads 25 of the shaft 20, restricts the guide 22 from moving more than a small distance. A second nut 26 is fitted to the tip of the shaft 20. A spring 27 is located between the first nut 24 and the second nut 26, and a disc member 28 is positioned between the spring 27 and the second nut 26.

A block 29 is coupled to the surface of the mirror retainer 6 opposite to the bend mirror 7, and a retaining member 30 is tapered and is pivotably coupled to the block 29 for retaining one end of the bend mirror 7. Namely, the outer periphery of the bend mirror 7 is pressed primarily against the inner periphery of the mirror retainer 6, and partly against the mirror holder 3 by the supporting member 30. Hence, the bend mirror 7 is pressed against the mirror holder 3 with one end thereof retained by the mirror retainer 6 and the other end retained by the retaining member 30. The outer circumference of the disc member 28 abuts the tapered surface of the retaining member 30 when the bend mirror 7 is installed on the mirror holder 3.

A detecting device 31 is also provided which comprises a characteristic of the present invention, and which is designed to detect a positional relationship between the mirror holder 3 and the mirror retainer 6. Namely, as shown in FIGS. 1 and 3, the detecting device 31 comprises two permanent magnets 32 and 33 provided parallel to each other a distance L apart in a predetermined area of the outer periphery of the mirror retainer 6 tip, and a magnetism sensor 34 locating its tip in the inner periphery of the mirror holder 3 and its center on a line bisecting the distance L between the two permanent magnets 32, 33. A detection signal line 35 of the magnetism sensor 34 is provided for the detecting device 31, and a coupling member 36 couples the mirror retainer 6 and the mirror holder 3 only when the magnetism sensor 34 is located on the line bisecting the distance L between the two permanent magnets 32, 33.

The operation of the laser beam reflector embodying the present invention will be described hereinafter.

First, the procedure of removing the one-piece structure of the mirror retainer 6 and the bend mirror 7 from the mirror holder 3 will be described in detail with reference to FIG. 2.

To remove the mirror retainer 6 and bend mirror 7 from the mirror holder 3, the pressing member 12 is pulled in the direction of arrow B, and the projection 11 of the mirror holder 3 is extracted from the hole 15 of the pressing member 12. In this state, the pressing member 12 is pivoted on the bolt 13 to disengage the pressing member 12 from the mirror retainer 6, and the handle 19 is pulled in the direction of arrow C. This allows the structure of the mirror retainer 6 and the bend mirror 7 to be unitarily removed from the mirror holder 3. To reinstall or couple the structure of the mirror retainer 6 and the bend mirror 7 to the mirror holder 3, the above-described procedure is reversed.

After the structure of the mirror retainer 6 and the bend mirror 7 has been removed from the mirror holder 3, the bend mirror 7 is removed from the mirror retainer 6 as follows. First, the handle 19 is pivoted on the supporting pivot point P in the direction of arrow A. This pivoting operation presses the pressed area 21 of the shaft 20 inwardly by the camming action of the handle 19 to move the guide 22 a small distance. The movement of the guide 22 disengages the disc member 28 from the retaining member 3 and allows the retaining member 30 to pivot in the direction of arrow D. As a result, the bend mirror 7 is released from the mirror retainer 6. To reinstall or couple the bend mirror 7 to the mirror retainer 6, the aforementioned procedure is reversed.

Figure 4:
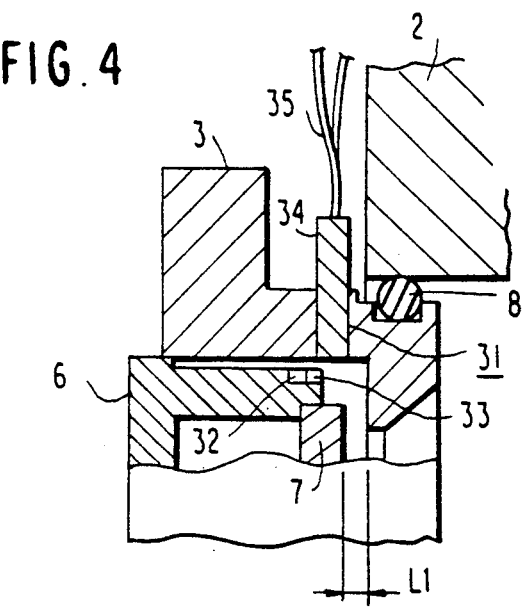
FIG. 4 is a partial sectional view illustrating the operation of the laser beam reflector shown in FIGS. 1-3.

When the unitary structure of the mirror retainer 6 and the bend mirror 7 is removed from the mirror holder 3 or when it is installed improperly on the mirror holder 3, (e.g. as illustrated in FIG. 4, when the mirror retainer 6 has moved a small distance L1, i.e. has been lifted from the proper installation position due to accidental shock or vibration, etc.), the center position of the magnetism sensor 34 and permanent magnets 32, 33 shift by the distance L1, resulting in the magnetism sensor 34 not correctly detecting the magnetism of the permanent magnets 32, 33. Hence, the magnetism sensor 34 stops outputting the detection signal to the detection signal line 35.

When the mirror retainer 6 and the mirror holder 3 have been installed properly as illustrated in FIG. 3, the center of the magnetism sensor 34 is aligned with that of the permanent magnets 32, 33 and the magnetism sensor 34 detects the magnetism generated by the permanent magnets 32, 33 and outputs the detection signal to the detection signal line 35. Therefore, the installation state of the mirror retainer 6 and the mirror holder 3 can be detected properly according to the detection signal of the magnetism sensor 34.

Figure 5:
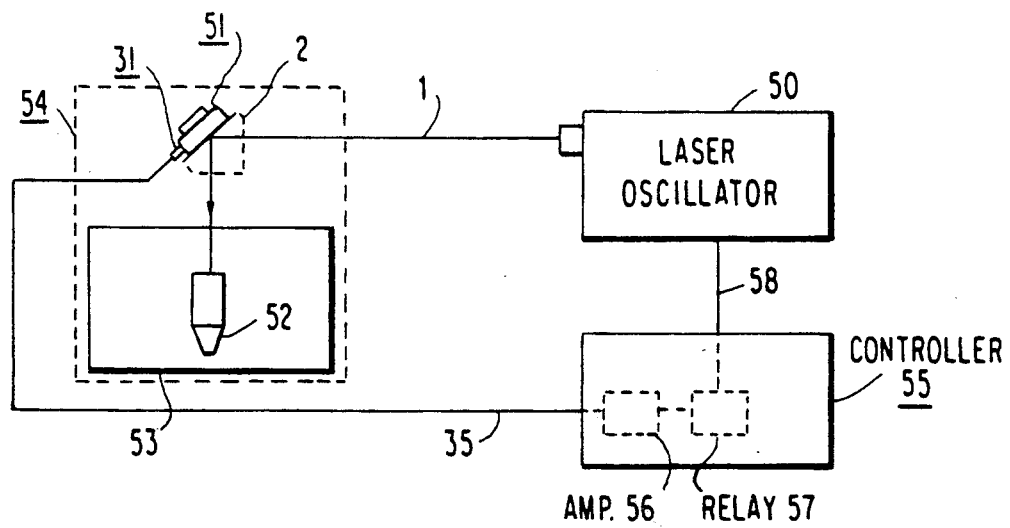
FIG. 5 is a block diagram illustrating the configuration of an embodiment of a laser beam cutting machine according to the present invention, which is equipped with the laser beam reflector according to the embodiment of the present invention.
Figure 8B:
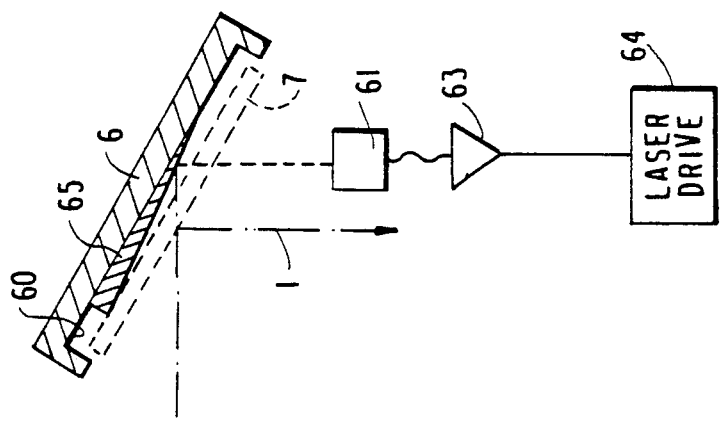
Figure 8A:
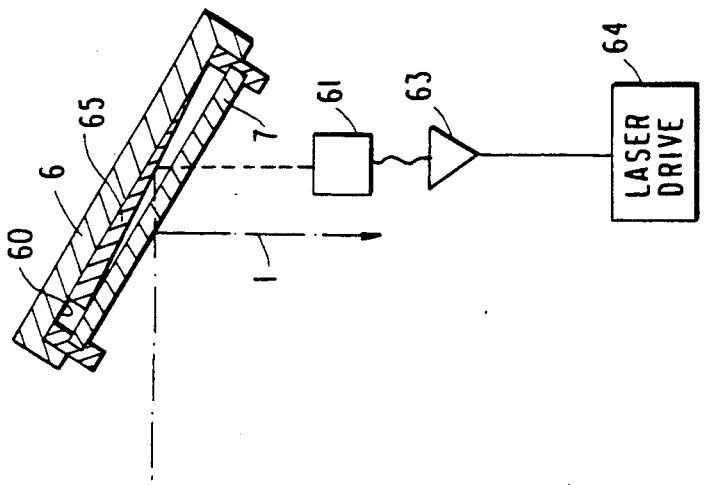
Figure 7:
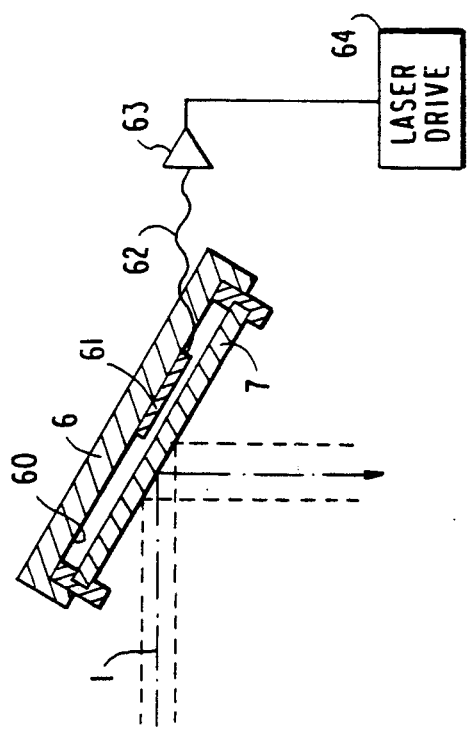

In FIG. 5, which is a block diagram of a laser-beam cutting machine which uses the laser beam reflector according to the above-described embodiment of the present invention, a laser oscillator 50 generates the laser beam 1. A laser beam reflector 51 of the above-described type is provided, and a cutting head 52 also is provided into which the laser beam 1 is directed. A cutting table 53 enables laser beam cutting to be performed. A laser beam cutting machine 54 includes an amplifier 56 for amplifying the detection signal transmitted to the detection signal line 35, and a relay 57 actuated by current from the amplifier 56. A controller 55 controls the laser oscillator 50 and the laser beam cutting machine 54. A control cable 58 sends the control signal from the relay 57 to the laser oscillator 50.

Operation of the laser beam cutting machine according to the present invention will be described hereinafter. Referring to FIG. 3 in which the mirror retainer 6 and the mirror holder 3 have been installed properly, the detection signal is output to the detection signal line 35 as described in the preceding embodiment, and then is transmitted to the controller 55. The controller 55 receives and amplifies the detection signal in the amplifier 56 and sends the detection signal to the relay 57. After receiving the detection signal which signifies "ON", the relay 57 outputs an "ON" signal command to the laser oscillator 50, indicating that laser oscillation may be performed. Upon receiving the "ON" signal command, the laser oscillator 50 is ready for a laser oscillation operation, and is allowed to receive an oscillation command. Hence, the oscillation command is not accepted when the detection signal is "OFF" (i.e., the "ON" signal is not received).

Referring to FIG. 4 in which the mirror retainer 6 and the mirror holder 3 have been installed improperly, the detection signal is not output to the detection signal line 35 as described above, and thus the controller 55 determines that detection is impossible, i.e. the detection signal is "OFF". Hence, the detection signal is not transmitted to the relay 57 via the amplifier 56, and thus the relay 57 determines that the detection signal is "OFF" and gives an "OFF signal" command to the laser oscillator 50 to stop the laser oscillation operation immediately.

It will be appreciated that design modifications may be made to the present invention. For example, the magnetic detector 34 provided for the mirror holder 3 and the permanent magnets 32, 33 installed in the mirror retainer 6 in the above-described embodiments may be provided in the opposite manner, i.e. the permanent magnets may be provided in the mirror holder 3 and the magnetic detector may be provided in the mirror retainer 6. Additionally, the exemplary device for detecting the coupling state of the mirror retainer 6 to the mirror holder 3 in the present invention is not limited to the combination of the permanent magnets and the sensor for detecting the magnetism thereof. For example, as shown in FIGS. 6A and 6B a proximity detector may be used which measures the position of the mirror directly and outputs an appropriate position detection signal. Additionally, optical detecting means utilizing light or any other detecting means may be utilized.

Additionally, although devices protecting the bend mirror 7 from being dropped from the mirror retainer 6 or from damage in general have not been illustrated or described, the technique disclosed in the Japanese Patent Disclosure Publication No. 109023/1984, described in the Background section above, may be employed for such protection.

Thus, in the present invention, the device for detecting the installation or coupling state of the mirror retainer 6 to the mirror holder 3 is not limited to the permanent magnets and magnetism sensor in the two above-described embodiments, i.e. other detecting devices may be employed and various design modifications may be made in practicing the invention.

It will be apparent that the above-described invention achieves a laser beam reflector which provides a detection signal according to the installation or coupling state of the mirror retainer to the mirror holder to stop laser oscillation precisely and assuredly when changing or cleaning the bend mirror fitted to the mirror retainer.

Consequently, the laser beam cutting machine, including the laser beam reflector according to the present invention and designed to control the laser oscillator according to the detection signal of the laser beam reflector, enhances operator and equipment safety during replacement or cleaning of the bend mirror. Moreover, since the laser beam generally is invisible, the present invention contributes largely to operator safety since in recent years the replacement or cleaning of the bend mirror primarily is performed manually.

The present invention is not confined to the embodiment described above, but may be embodied or practiced in other various ways without departing from the spirit or essential character thereof. Thus, the scope of the invention should be considered as being limited only by the appended claims.

What is claimed is:

1. A laser beam reflector for reflecting a laser beam from a laser oscillator in a direction different from said laser oscillator, said laser beam reflector comprising:
   a mirror holder;
   a mirror retainer removably coupled to said mirror holder;
   a bend mirror coupled to said mirror retainer for reflecting said laser beam; and
   detecting means for detecting a positional relationship between said mirror holder and said mirror retainer.

2. A laser beam reflector according to claim 1, wherein said detecting means comprises first and second permanent magnets and a magnetism sensor, and wherein said first and second permanent magnets are provided in one of said mirror holder and said mirror retainer, and wherein said magnetism sensor is provided in the other of said mirror holder and mirror retainer.

3. A laser beam reflector according to claim 2, wherein said first and second permanent magnets are provided parallel to each other a predetermined distance apart at an outer periphery of said one of said mirror holder and said mirror retainer.

4. A laser beam reflector according to claim 2, wherein a center of said magnetism sensor is located in a position on a line bisecting said first and second permanent magnets.

5. A laser beam reflector according to claim 2, further comprising coupling means for coupling said mirror retainer and said mirror holder together only when a center of said magnetism sensor is located in a position on a line bisecting said first and second permanent magnets.

6. A laser beam reflector according to claim 2, further comprising a detection signal line, said magnetism sensor outputting a detection signal to said detection signal line when said first and second permanent magnets are in a predetermined position.

7. A laser beam reflector according to claim 1, wherein said detecting means comprises optical detecting elements.

8. A laser beam reflector according to claim 1, wherein said detecting means comprises a proximity detector for detecting a position of said bend mirror directly.

9. A laser beam cutting machine comprising:
   a laser oscillator for generating a laser beam;
   a laser beam reflector comprising a mirror holder, a mirror retainer removably coupled to said mirror holder, and a bend mirror coupled to said mirror retainer;
   detecting means for detecting a positional relationship between said mirror holder and said mirror retainer; and
   a controller for controlling said laser oscillator according to a detection signal output by said detecting means.

10. A laser beam cutting machine according to claim 9, wherein said detecting means comprises first and second permanent magnets and a magnetism sensor, and wherein said first and second permanent magnets are coupled to one of said mirror holder and said mirror retainer and said magnetism sensor is coupled to the other of said mirror holder and mirror retainer.

11. A laser beam cutting machine according to claim 10, wherein said first and second permanent magnets are provided parallel to each other a predetermined distance apart at an outer periphery of said one of said mirror holder and said mirror retainer.

12. A laser beam cutting machine according to claim 10, wherein a center of said magnetism sensor is located in a position on a line bisecting said first and second permanent magnets.

13. A laser beam cutting machine according to claim 10, further comprising coupling means for coupling said mirror retainer and said mirror holder together only when a center of said magnetism sensor is located in a position on a line bisecting said first and second permanent magnets.

14. A laser beam cutting machine according to claim 10, further comprising a detection signal line, said magnetism sensor outputting a detection signal to said detection signal line when said first and second permanent magnets are in a predetermined position.

15. A laser beam cutting machine according to claim 9, wherein said detecting means comprises optical detecting elements.

16. A laser beam cutting machine according to claim 9, wherein said detecting means comprises a proximity detector for detecting a position of said bend mirror directly.

17. A laser beam cutting machine according to claim 9, wherein a detection signal is output by said detecting means when said mirror retainer and said mirror holder are in a predetermined positional relationship.

* * * * *